US012804735B2

(12) United States Patent
Kalam et al.

(10) Patent No.: US 12,804,735 B2
(45) Date of Patent: Nov. 17, 2026

(54) SYSTEMS AND METHODS FOR CONTROLLING THE COVERAGE OF WI-FI MESH SIGNALS

(71) Applicant: DISH Network Technologies India Private Limited, Bangalore (IN)

(72) Inventors: Arun Pulasseri Kalam, Bangalore (IN); Anandaraj P, Bangalore (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 218 days.

(21) Appl. No.: 18/614,331

(22) Filed: Mar. 22, 2024

(65) Prior Publication Data

US 2025/0301512 A1 Sep. 25, 2025

(51) Int. Cl.

*H04W 76/10* (2018.01)
*H04W 28/02* (2009.01)
*H04W 84/12* (2009.01)

(52) U.S. Cl.

CPC ....... *H04W 76/10* (2018.02); *H04W 28/0226* (2013.01); *H04W 84/12* (2013.01)

(58) Field of Classification Search

CPC . H04W 24/08; H04W 28/0226; H04W 36/08; H04W 36/304; H04W 72/04; H04W 76/10; H04W 84/12
USPC .......................................... 370/311, 318, 329
See application file for complete search history.

(56) References Cited

U.S. PATENT DOCUMENTS

| | | | | |
|---|---|---|---|---|
| 2021/0211900 | A1* | 7/2021 | Pius ...................... | H04W 24/08 |
| 2024/0334397 | A1* | 10/2024 | Asterjadhi ............ | H04W 72/04 |
| 2025/0168733 | A1* | 5/2025 | Lal ...................... | H04W 36/304 |

* cited by examiner

*Primary Examiner* — Harun Chowdhury
(74) *Attorney, Agent, or Firm* — Seed Intellectual Property

(57) ABSTRACT

A network configuration system is provided herein. The network configuration system identifies a set of client devices connected to a network. The network configuration system determines a coverage requirement and a data requirement for each client device. The network configuration system determines a W-Fi configuration for each client device based on the coverage requirement and data requirement determined for the client device. The network configuration system causes the client device to transmit data based on the determined Wi-Fi configuration.

20 Claims, 7 Drawing Sheets

300 client device data table

| | Device | Attributes | Wi-Fi configuration | Active times |
|---|---|---|---|---|
| 301 | Client Device 1 | Smart Lights;<br>Wi-Fi 2.4Ghz Antenna; | MCS 1;<br>100 mw | 5:00pm-10:00pm |
| 302 | Client Device 2 | Android Phone;<br>Wi-Fi 2.4/5/6 GHz Antenna; | MCS 4;<br>300 mw | 7:00am-9:00pm |
| 303 | Client Device 3 | iPhone;<br>Wi-Fi 2.4/5/6 GHz Antenna; | MCS 4;<br>300 mw | 6:00am-12:00pm |
| 304 | Client Device 3 | iPhone;<br>Wi-Fi 2.4/5/6 GHz Antenna; | MCS 6;<br>500 mw | 7:00pm-11:00pm |
| | ⋮ | ⋮ | ⋮ | ⋮ |
| | 312 | 313 | 314 | 315 |

FIG. 3

SYSTEMS AND METHODS FOR CONTROLLING THE COVERAGE OF WI-FI MESH SIGNALS

BACKGROUND

When connecting to an access point, Wi-Fi enabled devices communicate with the access point to identify a modulation and coding scheme ("MCS") for the device to use. In a "Wi-Fi Mesh System" multiple access points may be used to facilitate connection to a common Wi-Fi network. It is with respect to this and other considerations that the embodiments described herein have been made.

BRIEF SUMMARY

The embodiments disclosed herein improve the technology of Wi-Fi mesh systems by providing a technical solution that determines a coverage requirement and data requirement of a device connecting to an access point of a Wi-Fi mesh system and generates a Wi-Fi configuration for the device based on the coverage and data requirements. The embodiments disclosed herein may use data indicating a data throughput of a client device to determine a coverage requirement for the client device. The embodiments disclosed herein may use data indicating a throughput margin of an access point to determine a data requirement for a client device. Furthermore, the embodiments disclosed herein may determine an MCS for a client device as part of determining the Wi-Fi configuration for the device.

In some embodiments, a system for configuring a Wi-Fi connection for a set of client devices connected to a network identifies the set of client devices, the set including one or more client devices. The system may determine a coverage requirement and a data requirement for each respective client device of the set of client devices. The system may determine a Wi-Fi configuration for each respective client device based on the determined coverage requirement and determined data requirement. The system may cause each respective client device of the set of client devices to transmit data based on the determined Wi-Fi configuration for the respective device.

In some embodiments, to cause a client device to transmit data based on the determined Wi-Fi configuration, the system transmits information that instructs the client device to configure its Wi-Fi configuration based on a Wi-Fi configuration determined for the client device.

In some embodiments, to determine the coverage requirement of a client device, the system receives data indicating a data throughput of the client device at one or more times. The system may determine the coverage requirement of the client device based on the data indicating the data throughput of the client device at one or more time.

In some embodiments, to determine the coverage requirement of a client device, the system receives data indicating that the client device is expected to transmit a selected type of data. The system may determine an expected throughput of the client device based on the data indicating that that the client device is expected to transmit the selected type of data, the system may determine the coverage requirement of the client device based on the expected throughput of the client device.

In some embodiments, to determine the data requirement of a client device, the system determines a throughput margin of an access point of the network at one or more times. The one or more times may include at least one idle time of the access point. The system may determine the data requirement of the client device based on the data indicating the throughput margin of the access point at one or more times.

In some embodiments, to determine the data requirement of a client device, the system receives data indicating that the client device is expected to transmit a selected type of data. The system may determine a throughput margin of an access point at one or more times. The system may determine the coverage requirement of the client device based on the selected type of data and the throughput margin.

In some embodiments, the system receives data indicating a data throughput at one or more times of each client device of the set of client devices. The system may train a machine learning model to determine a data throughput required by a client device based on the data received for each client device. The system may determine the coverage requirement of a client device by applying an indication of the client device and a time at which the client device is expected to transmit data to the machine learning model.

In some embodiments, the system receives data indicating a throughput margin of an access point at one or more times. The system may train a machine learning model to determine a data requirement of a client device based on the data indicating the throughput margin of the access point at one or more times. The system may determine the data requirement of a client device by applying an indication of the client device and a time at which the client device is expected to transmit data to the machine learning model.

In some embodiments, to determine the Wi-Fi configuration for a client device, the system receives data indicating one or more attributes of the client device. The system may determine the Wi-Fi configuration for the client device based on a coverage requirement, data requirement, and the one or more attributes.

In some embodiments, to determine the Wi-Fi configuration for a client device, the system determines a transmission power of the client device based on a data requirement. The transmission power may be greater than, less than, or equal to the current transmission power of the client device.

In some embodiments, to determine the Wi-Fi configuration of a client device, the system determines a modulation coding scheme ("MCS") for the client device. The determined MCS may be different from, or the same as, the current MCS used by the client device.

In some embodiments, to determine the Wi-Fi configuration for a client device, the system determines a location of the client device relative to an access point of a network. The system may determine the Wi-Fi configuration based on a coverage requirement, a data requirement, and a location of the client device relative to the access point.

In some embodiments, to determine the Wi-Fi configuration for a client device, the system determines which of an MCS or a transmission power of the client device should be changed first. The system may determine the Wi-Fi configuration based on a coverage requirement, a data requirement, and the determination of which of the MCS or transmission power should be changed first.

In some embodiments, a method performed by a client device may comprise connecting to a network via an access point and transmitting data via the network. In some embodiments, the transmitted data indicates a coverage requirement, a data requirement, or some combination thereof, of the client device. The method may further include receiving an indication from a network configuration system that indicates a network configuration, such as a Wi-Fi configuration, for the client device. The network configuration may be generated based on data transmitted by the client device. The method may further include altering the network configuration of the client device based on the indicated network configuration.

The method may further include altering the network configuration of a client device by altering one or more of an MCS or a transmission power based on the determined network configuration.

The method may further include transmitting an indication to the network configuration system that the client device is to transmit a selected type of data.

The method may further include transmitting an indication of one or more attributes of the client device to the network configuration system.

BRIEF DESCRIPTION OF THE DRAWINGS

FIG. 3 is a table diagram depicting a sample client device data table, according to various embodiments described herein.

DETAILED DESCRIPTION

Figure 1:
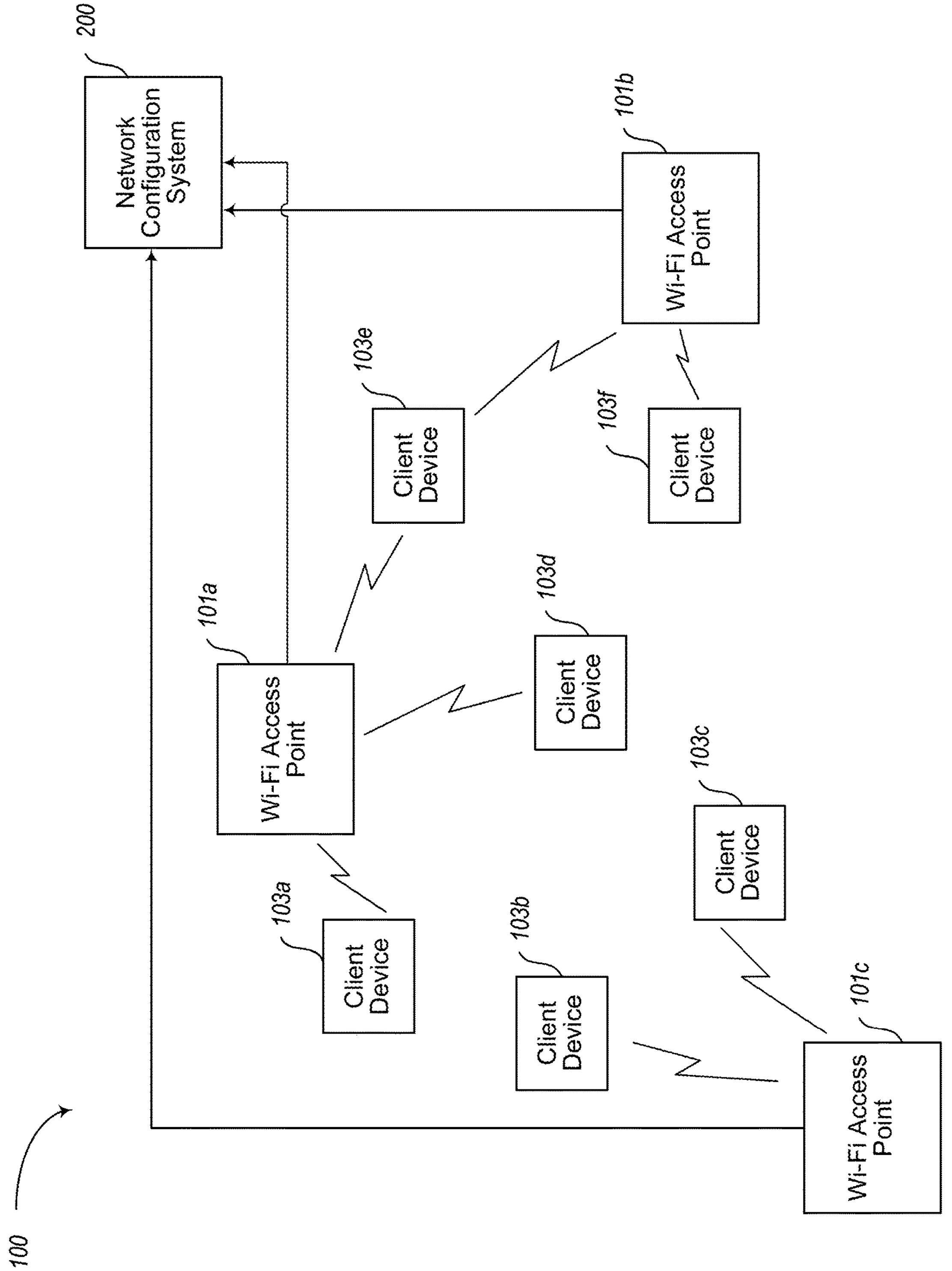
FIG. 1 is a display diagram depicting a sample environment in which a network configuration system operates, according to various embodiments described herein.

As Wi-Fi mesh systems become more widely used, many different types of devices connect to such systems. Each of these devices may be able to use one or more modulation coding schemes ("MCS") to reduce the impact of signal interference caused by each of the devices. Conventional Wi-Fi mesh systems allow devices to transmit data at any transmission power, and instruct the devices to use the most recent MCS supported by the device. However, this results in excess signal interference caused by devices connected to the network because the devices are often using the same MCS, thus inhibiting the effectiveness of the ability of the MCS to reduce interference. Additionally, the devices cause excess signal interference by transmitting data at transmission powers that don't take into account how far the signal carrying the data actually needs to travel to reach an access point and that don't take into account the presence of other data signals transmitted by other devices connected to the network. Furthermore, attempts to use RSSI to determine the coverage required by user devices are flawed because RSSI is calculated in many different ways, and each device may have a different calculation for RSSI.

The embodiments disclosed herein improve the technology of Wi-Fi mesh systems by providing a technical solution that determines a coverage requirement and data requirement of a device connecting to an access point of a Wi-Fi mesh system and generates a Wi-Fi configuration for the device based on the coverage and data requirements. The embodiments disclosed herein may use data indicating a data throughput of a client device to determine a coverage requirement for the client device. The embodiments disclosed herein may use data indicating a throughput margin of an access point to determine a data requirement for a client device. Furthermore, the embodiments disclosed herein may determine an MCS for a client device as part of determining the Wi-Fi configuration for the device.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed to include "and/or" unless the content clearly dictates otherwise. The term "and/or" is generally employed to include an inclusive or.

The headings and Abstract of the Disclosure provided herein are for convenience only and do not interpret the scope or meaning of the embodiments.

FIG. 1 is a display diagram depicting a sample environment 100 in which a network configuration system 200 operates, according to various embodiments described herein. The environment 100 includes access points 101*a*-101*c*, client devices 103*a*-103*f*, and network configuration system 200. The environment 100 is one instance of an environment in which the network configuration system 200 may operate, and the network configuration system 200 may operate in other environments. Moreover, the network configuration system 200 may be included in one or more of the devices or access points described in FIG. 1 or in one or more other computing devices not illustrated in FIG. 1. The network configuration system 200 is discussed in more detail below, in connection with FIG. 2.

The Wi-Fi access points 101*a*-101*c* (collectively "access points 101" or individually as "access point 101") are each access points that operate on a network, such as, for example, a Wi-Fi network, a telecommunication network, or any other network that provides client devices with access to networking services. In some embodiments, the access points are part of a Wi-Fi mesh system that operates a Wi-Fi network by receiving data from one or more client devices via the access points. Any one or more of the access points 101 may be a "base access point," "base node," etc., that acts as a main router connecting devices that are connected to the network to devices, servers, data sources, etc., outside of the network. An access point, such as the access points 101, may facilitate the transmission and reception of signals to and from devices connected to the network. An access point may facilitate the transmission of and reception of the signals by routing the signals to, or receiving signals from, a base access point of a Wi-Fi mesh system, one or more other access points, etc. Thus, in an example embodiment, a client device, such as the client device 103*a*, may transmit or receive data via the access point 101*a*, the access point 101*a* transmits or receives data via the base access point of the network, and the base access point of the network routes data outside of the network, to other devices in the network, etc. In facilitating the transmission and reception of signals, an access point 101 may transmit instructions to devices to use a network configuration to transmit signals, such as a Wi-Fi configuration generated by the network configuration system 200. In some embodiments, the access points 101 include access points for one or more networks that are not Wi-Fi networks, such as telecommunications networks.

The client devices 103*a*-103*f* (collectively "client devices 103" or "client devices 103" or individually as "client device 103" or "client device 103") may be one or more endpoint devices, such as PCs, tablets, laptop computers, smartphones, personal assistants, drones, Internet connection devices, wireless LAN, Wi-Fi, Worldwide Interoperability for Microwave Access (WiMax) devices, or the like, and may be communicatively coupled to the network or to each other so that the plurality of endpoint devices are communicatively coupled together. The client devices 103 may be communicatively coupled to the network via interaction with an access point, such as one or more of the access points 101. The client devices 103 may receive instructions from such an access point indicating a configuration for the client device to use to transmit signals on the network.

The network within which the access points 101 and client devices 103 operate may be a network, communication system, or networked system (not shown), to which the client devices 103*a*-103*f*, access points 101*a*-101*c*, and network configuration system 200, may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like.

Figure 2:
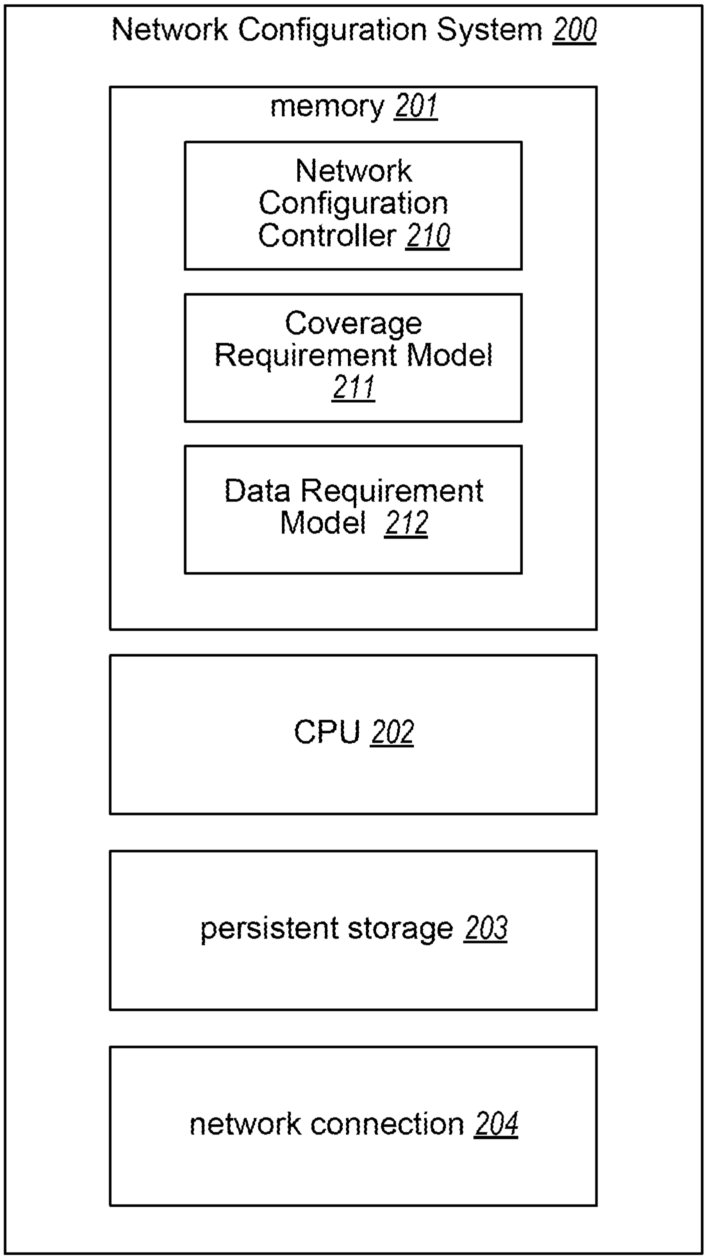
FIG. 2 is a block diagram depicting example components incorporated in a neatwork configuration system, according to various embodiments described herein.

FIG. 2 is a block diagram depicting example components incorporated in a network configuration system 200, according to various embodiments described herein.

The network configuration system 200 may be: located on a network in a position to communicate with one or more access points, client devices, or any entity associated with any of the nodes, access points, client devices, or network; integrated as part of a node or access point, such as the access points 101; or located at any other devices in which the network configuration system 200 is able to perform at least some of its functions. In various embodiments, the network configuration system 200 includes one or more of the following: a computer memory 201, a processor 202, a persistent storage device 203, and a network connection 204. The memory 201 may be used for storing programs and data while they are being used, including data associated with the various data requirements of client devices or access points (not shown), coverage requirements of client devices or access points (not shown), access points, client devices, interfering devices, an operating system including a kernel (not shown), device drivers (not shown), and one or more machine learning models. The processor 202 may be used for executing computer programs (not shown), such as computer programs which perform some or all of the functions of the network configuration system. In some embodiments, the processor 202 may be one or more processors, microcontrollers, or other computer components. In some embodiments, any of the processors, microcontrollers, or other computer components, either alone or in combination, can perform any of the functions or acts described herein. The persistent storage device 203 may be a hard drive or flash drive for persistently storing programs and data. The network connection 204 may be used for connecting to one or more access points or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals associated with client devices, access points, devices or components associated with the network, and for connecting to one or more computer devices such as access points, client devices, devices or components associated with the network, or other computer systems. In various embodiments, the network configuration system 200 additionally includes input and output devices, such as a keyboard, a mouse, display devices, etc. In some embodiments, all or part of the network configuration system 200 is included within an access point, such as the access points 101 described above in connection with FIG. 1.

While a network configuration system 200 configured as described may be used in some embodiments, in various other embodiments, the network configuration system 200 may be implemented using devices of various types and configurations and having various components. The memory 201 may include a network configuration controller 210, which contains computer-executable instructions that, when executed by the CPU 202, cause the network configuration system 200 to perform the operations and functions described herein. For example, the programs referenced above, which may be stored in computer memory 201, may include or be comprised of such computer-executable instructions. The memory 201 may also include a network configuration data structure, which includes data related to operations performed by the network configuration system, a coverage requirement model 211 that determines a coverage requirement for a client device, and a data requirement model that determines a data requirement for a client device.

The network configuration controller 210 performs the core functions of the network configuration system 200, as discussed herein and also with respect to FIGS. 3-9. In particular, the network configuration controller 210 generates a network configuration for a client device based on a data requirement and a coverage requirement of the device. Additionally, the network configuration controller 210 may change a transmission power, a MCS, or a combination thereof, based on the generated network configuration. The network configuration controller 210 may also perform other functions related to determining or generating a network configuration for a client device.

The coverage requirement model 211 is an artificial intelligence or machine learning model that is trained to determine a coverage requirement for a client device based on an indication of the client device and a time at which the client device is expected to transmit data. The data requirement model 212 is an artificial intelligence or machine learning model that is trained to determine a data requirement for a client device based on an indication of the client device and a time at which the client device is expected to transmit data.

In an example embodiment, the network configuration controller 210 or computer-executable instructions stored on memory 201 of the network configuration system 200 are implemented using standard programming techniques. For example, the network configuration controller 210 or computer-executable instructions stored on memory 201 of the network configuration system 200 may be implemented as a "native" executable running on CPU 202, along with one or more static or dynamic libraries. In other embodiments, the network configuration controller 210 or computer-executable instructions stored on memory 201 of the network configuration system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single processor computer system, or alternatively decomposed using a variety of structuring techniques known in the art, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the network configuration controller 200.

In addition, programming interfaces to the data stored as part of the network configuration controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The network configuration controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the network configuration controller 200.

Furthermore, in some embodiments, some or all of the components/portions of the network configuration controller 210, or functionality provided by the computer-executable instructions stored on memory 201 of the network configuration system 200 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the client devices, access points, interface mitigation system, interfering devices, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The operation of certain aspects will now be described with respect to FIGS. 3-9. In at least one of various embodiments, processes 400, 500, 600, 700, 800, and 900 described in conjunction with FIGS. 4-9, respectively, may be implemented by one or more processors or executed via circuitry on one or more computing devices, such as the network configuration system 200 described in connection with FIG. 2, the client devices 103 described in connection with FIG. 1, the access points 101 described in connection with FIG. 1, other computing devices, or some combination thereof. In at least one of various embodiments, the data table 300 described in conjunction with FIG. 3 is an illustration of how data used by a network configuration system may be accessed or stored. The data table 300 may be stored or accessed by one or more computing devices, such as the network configuration system 200 described in connection with FIG. 2, the client devices 103 described in connection with FIG. 1, the access points 101 described in connection with FIG. 1, other computing devices, or some combination thereof.

FIG. 3 is a table diagram depicting a sample client device data table 300, according to various embodiments described herein. The table 300 includes sample data that is in human-readable form and implementations of the network configuration system may include data in other forms. Furthermore, the table 300 is non-exhaustive, and implementations of the network configuration system may include additional data, rows, columns, etc., which are not shown in FIG. 3.

The client device data table 300 includes a device column 312, an attribute column 313, a Wi-Fi configuration column 314, and an active times column 315. The entity column 312 includes data indicating an individual client device. The client device may be a client device connected to a network associated with a network configuration system, such as the network configuration system 200. The attributes column 313 includes data indicating one or more attributes of a client device. In some embodiments, the attributes of a client device include one or more of: a type of the client device, one or more Wi-Fi or other network capabilities of the client device, or other attributes of a client device. The Wi-Fi configuration column 314 includes data indicating a Wi-Fi configuration for a client device. In some embodiments, in the Wi-Fi configuration column, the transmission power is represented by milliwatts, decibels per milliwatts, or other units of transmission power. The active time column 315 includes data indicating one or more active times of the client device. In some embodiments, the active time column 315 also indicates when the client device is to use the Wi-Fi configuration indicated in the corresponding Wi-Fi configuration column. Although four columns are included in the data table 300, embodiments are not so limited, and the data table 300 may have additional, fewer, different, etc., columns in other embodiments, such as columns regarding coverage requirements for client devices at one or more times, data requirements for client devices at one or more times, data throughput for client devices at one or more times, or any other data that may be used by the system 200.

Each row in the table 300 includes data related to a device identified in the device column 312. As an example, row 301 indicates that "client device 1" has a 2.4 Ghz antenna, is active between 5:00 pm and 10:00 pm, and is configured to use MCS 1 and a transmission power of 100 milliwatts. As another example, row 301 indicates that "client device 3" uses MCS 4 and a transmission power of 300 milliwatts between 6:00 am and 12:00 pm, and uses MCS 6 and a transmission power of 500 milliwatts between 7:00 pm and 11:00 pm.

Figure 4:
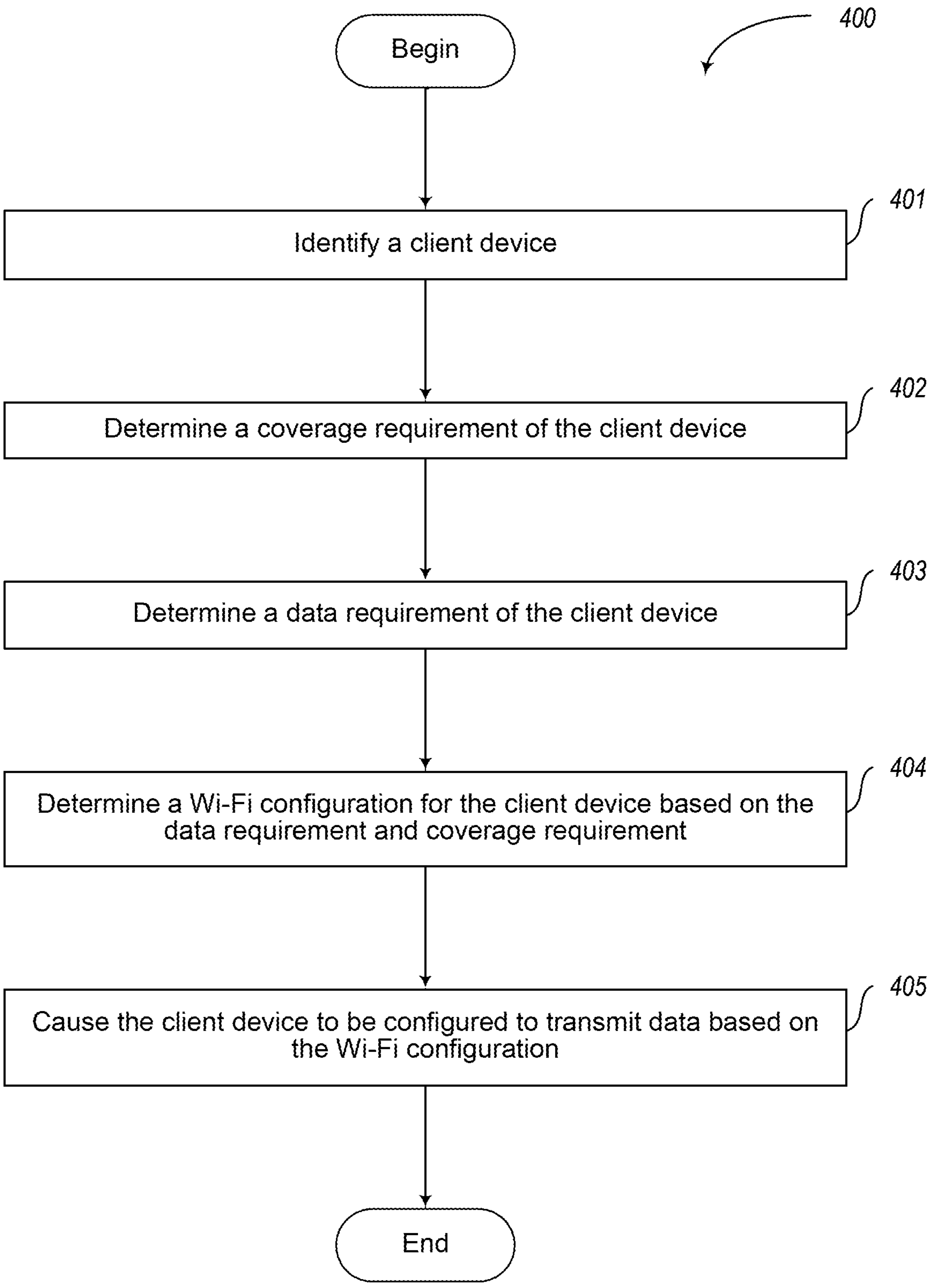
FIG. 4 is a flow diagram depicting a process for generating a Wi-Fi configuration for a client device, according to various embodiments described herein.

FIG. 4 is a flow diagram depicting a process 400 for generating a Wi-Fi configuration for a client device, according to various embodiments described herein. The process 400 may be performed by a network configuration system, such as the network configuration system 200 described above with respect to FIG. 2. In some embodiments, as part of performing the acts included in the process 400, the network configuration system performs one or more of the acts included in the processes 500, 600, 700, 800, and 900 described below in connection with FIGS. 5-9.

The process 400 begins, after a start block, at act 401, where the network configuration system identifies a client device connected to a network. In some embodiments, the identified client device is one of a set of client devices connected to the network.

The process 400 proceeds to act 402, where the network configuration system determines a coverage requirement of the client device. In some embodiments, the network configuration system uses at least a portion of the process 500, the process 800, or some combination thereof to perform act 402.

The process 400 proceeds to act 403, where the network configuration system determines a data requirement of the client device. In some embodiments, the network configuration system uses at least a portion of the process 600, the process 900, or some combination thereof, to perform act 403.

The process 400 proceeds to act 404, where the network configuration system determines a Wi-Fi configuration for the client device based on the data requirement and the coverage requirement. In some embodiments, the network configuration system uses at least a portion of the process 700 to perform act 404. In some embodiments, the network configuration system selects an MCS, transmission power, or some combination thereof for the Wi-Fi configuration based on the data requirement and the coverage requirement. In some embodiments, the network configuration system incrementally changes an MCS, transmission power, or some combination thereof for the Wi-Fi configuration until a threshold data throughput, threshold data consumption, or another threshold value or range related to signals transmitted by the client device is attained. In some embodiments, the network configuration system uses a location of a client device, such as a geographical location, a distance of the client device from one or more access points, or other methods of representing a location of a client device relative to one or more access points, to determine the Wi-Fi configuration. In some embodiments, the network configuration system uses data regarding one or more barriers between the client device and one or more access points to determine the Wi-Fi configuration. In some embodiments, the network configuration system uses one or more attributes of the access point, client device, or some combination thereof, to determine the Wi-Fi configuration. In some embodiments, the network configuration system uses data indicating one or more times at which the client device is active on, or otherwise accesses, the network to determine the Wi-Fi configuration.

In some embodiments, as part of performing act 404, the network configuration system determines whether current MCS, transmission power, or some combination thereof, used by the client device is to be changed. For example, the network configuration system may determine based on the data coverage requirement and data requirement that the data throughput required by the client device exceeds a threshold range and that "idle time" of the access point exceeds a threshold range, and that the transmission power of the client device should be reduced but that the MCS should remain the same.

In another example, the network configuration system may determine that the transmission power should not be changed, but that the MCS of the access point and client device should be changed. Such a determination may be based on the data and coverage requirements as well as a current receiver sensitivity of the access point, client device, or some combination thereof. In this example, the network configuration system changes the MCS such that a transmission power within a threshold range that includes the current transmission power can be used by the access point and client device to communicate (e.g. if the receiver sensitivity can be higher the MCS can be reduced and the transmission power does not need to increase in order for the client device and access point to communicate).

In yet another example, the network configuration system may determine that both the transmission power and MCS should be changed. For example, the client device may be a device that consumes data below a threshold range and may also be located near the access point. In such an example, a higher MCS value is not needed due to the low data consumption and relatively small distance between the client device and access point. Furthermore, in this example, the transmission power can also be lowered due to the same reasons.

In some embodiments, the network configuration system may determine which of the MCS or transmission power should be changed first and determine whether the other of the MCS or transmission power should be changed after the first change is made. Thus, in some embodiments, the transmission power level used by the client device may be different from the transmission power level typically used by the MCS used by the client device. For example, the network configuration system may determine that changing the MCS for a client device had the effect of reducing interference to a threshold level, and thus determine that the transmission power of the client device does not need to change. In another example, the network configuration system may determine that changing a transmission power improved the signal transmitted by the client device by a threshold amount, and thus determine that the MCS does not need to change. In yet another example, the network configuration system may determine that changing the MCS did not result in a threshold amount of improvement in the signal transmitted by the client device, and that the transmission power should be changed.

In some embodiments, the network configuration system accesses historical data indicating one or more data requirements determined for one or more client devices in the past, one or more Wi-Fi configurations determined for one or more client devices in the past, one or more coverage requirements determined for one or more client devices in the past, or some combination thereof. In such embodiments, the network configuration system may use the historical data to perform any of acts 402, 403, 404, or some combination thereof. For example, the network configuration system may determine that a first cellular telephone has connected to the network and that a second cellular telephone with the same model as the first cellular telephone has already connected to the network in the past. For example, the network configuration system may determine that the first cellular telephone should have the same coverage requirement as the second cellular telephone, the same data requirement, the same Wi-Fi configuration, etc. In another example, the network configuration system may identify a plurality of similar client devices, and aggregate one or more of the data requirement, coverage requirement, or Wi-Fi configuration of the plurality of similar client devices to determine the data requirement, coverage requirement, or Wi-Fi configuration of a client device.

The process 400 proceeds to act 405, where the network configuration system causes the client device to be configured to transmit data based on the determined Wi-Fi configuration. In some embodiments, at act 405, the network configuration system transmits instructions, data, signals, information, or some combination thereof that indicate the determined Wi-Fi configuration to the client device. In some embodiments, at act 405, the network configuration system transmits instructions, data, signals, or some combination thereof that indicate the determined Wi-Fi configuration to the access point.

In some embodiments, the network configuration system transmits one or more additional Wi-Fi configurations to a client device. The network configuration system may transmit additional Wi-Fi configurations to a client device at one or more future times, with the determined Wi-Fi configuration, or some combination thereof. In such embodiments, the network configuration system may determine the additional Wi-Fi configurations based on a determination that a threshold amount of time has passed, a determination that there is interference on the network, a determination that the client devices connected to the network have changed, a determination that a Wi-Fi configuration of one or more client devices connected to the network has changed, a determination that the client device has moved, a determination that the access point has moved, a determination that an access point of the network has changed, a determination that the client device is expected to, or is already, transmitting a selected type of data, a determination that an attribute of the client device has changed, a determination that the transmission or reception of data by the client device can be made more efficient, other situations in which changing a Wi-Fi configuration of a client device may be beneficial, or some combination thereof.

After act 405, the process 400 ends.

In some embodiments, the network configuration system performs the process 400 with respect to a plurality of user devices. In such embodiments, the network configuration system may use data indicating the coverage requirements, data requirements, attributes, locations, or other aspects of the plurality of client devices, to determine the Wi-Fi configuration for one or more of the plurality of client devices.

Figure 5:
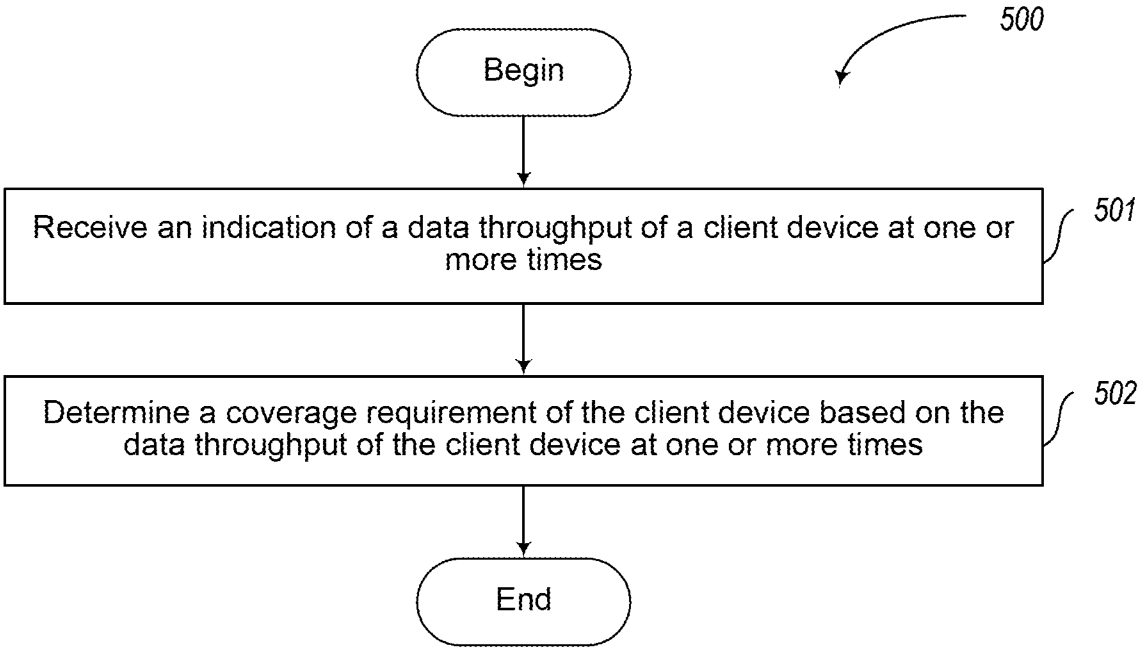
FIG. 5 is a flow diagram depicting a process for determining a coverage requirement of a client device, according to various embodiments described herein.

FIG. 5 is a flow diagram depicting a process 500 for determining a coverage requirement of a client device, according to various embodiments described herein. The process 500 may be performed by a network configuration system, such as the network configuration system 200 described above with respect to FIG. 2.

The process 500 begins, after a start block, at act 501, where the network configuration system receives an indication of a data throughput of a client device at one or more times. In some embodiments, the indication of the data throughput of the client device includes an indication of the current data throughput, an indication of a past data throughput, an indication of a future data throughput, or some combination thereof. In some embodiments, the network configuration system receives the indication of the data throughput multiple times. In some embodiments, the indication of a data throughput includes an indication of a time at which the data throughput was used, a type of the data transmitted by the client device, an application or program associated with the data transmitted by the client device, or some combination thereof. In some embodiments, the indication of the data throughput of the client device is received from the client device, the access point, the network configuration system, or some combination thereof.

The process 500 proceeds to act 502, where the network configuration system determines a coverage requirement of the client device based on the indication of the data throughput of the client device at one or more times. In some embodiments, the network configuration system determines the coverage requirement by determining the amount of data sent by the access point to the client device and the amount of data received by the client device from the access point. In some such embodiments, the network configuration system may also determine the coverage requirement based on the data sent by the access point, the data received by the client device, and an indication of: whether the function, need, etc., of the data has been met, whether the client device encountered an error with the data, or some combination thereof.

In some embodiments, the network configuration system determines whether a function of the data is met based on information regarding the client device. The network configuration system may receive the information regarding the client device based on data regarding the establishment of the connection between the client device and an access point to which the client device has connected. For example, if the client device is an internet of things ("IoT") device, the network configuration system may determine the type of information the client device typically receives from a network connection based on a type or function of the IoT device.

In another example, if the client device is a streaming device, the network configuration system may use the information regarding the client device to determine whether a user of the client device is streaming video, audio, or other data that may be streamed to the device. In such an embodiment, the network configuration system may determine whether the client device has begun streaming data and may increase the data requirement of the client device based on a determination that the client device has begun streaming data.

In some embodiments, the network configuration system determines whether a function of the data has been met by determining whether the client device has made additional requests for data. In such embodiments, the network configuration system may use the determination of whether additional requests for data have been made by the client device to determine a data requirement for the client device. For example, if a user of the client device begins streaming video, audio, or other data, via the client device the network configuration system may monitor the timing of requests for data and the size of data packets received in response to the requests for data. In such an example, the network configuration system may determine whether a threshold number of requests for data have been received within a threshold period of time to determine whether the client device requires a higher data throughput, as represented by the data requirement. In such an example, the network configuration system may raise the data requirement for the client device in response to the determination.

After act 502, the process 500 ends.

Figure 6:
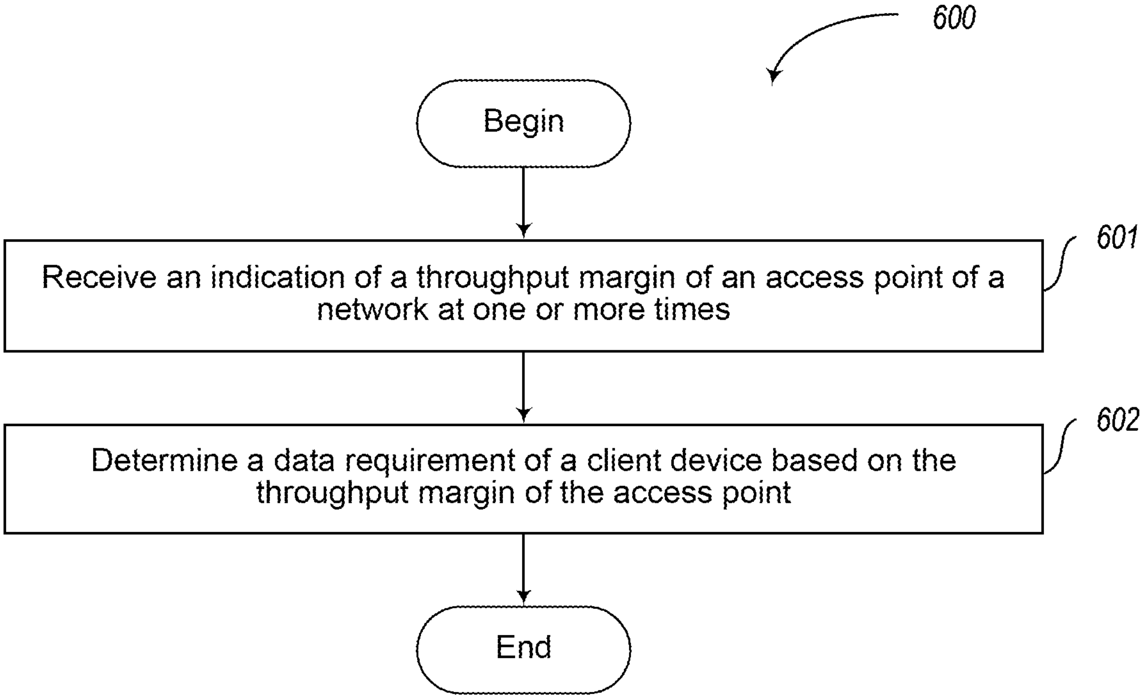
FIG. 6 is a flow diagram depicting a process for determining a throughput margin of an access point, according to various embodiments described herein.

FIG. 6 is a flow diagram depicting a process 600 for determining a throughput margin of an access point, according to various embodiments described herein. The process 600 may be performed by a network configuration system, such as the network configuration system 200 described above with respect to FIG. 2.

The process 600 begins, after a start block, at act 601, where the network configuration system receives an indication of a throughput margin of an access point at one or more times. In some embodiments, the indication of the throughput margin of the access point includes an indication of the current idle time of the access point, an indication of a past idle time of the access point, an indication of a future idle time of the access point, or some combination thereof. In some embodiments, the network configuration system receives the indication of the throughput margin multiple times. In some embodiments, the indication of a throughput margin includes an indication of a time at which the throughput margin occurred, a type of the data transmitted by client devices connected to the access point, an application or program associated with the data transmitted by the client devices connected to the access point, a number of client devices connected to the access point, or some combination thereof. In some embodiments, the indication of the throughput margin of the access point is received from the access point, the network configuration system, or some combination thereof. In some embodiments, a throughput margin is determined based on an idle time of an access point during a range of time and the amount of data moving through the access point during the range of time. For example, if an access point is idle half of the time between 12:00 pm and 1:00 pm and 10 Mbps of data moves through the access point during that range of time, then the throughput margin of the access point from 12:00 pm to 1:00 pm is 20 Mbps.

The process 600 proceeds to act 602, where the network configuration system determines a data requirement for a client device based on the throughput margin of the access point. The network configuration system may determine the data requirement of the client device based on an amount of data consumed, or expected to be consumed, by the client device and the throughput margin of the access point. The amount of data consumed, or expected to be consumed, by the client device may be determined based on a data throughput of the client device.

After act 602, the process 600 ends.

Figure 7:
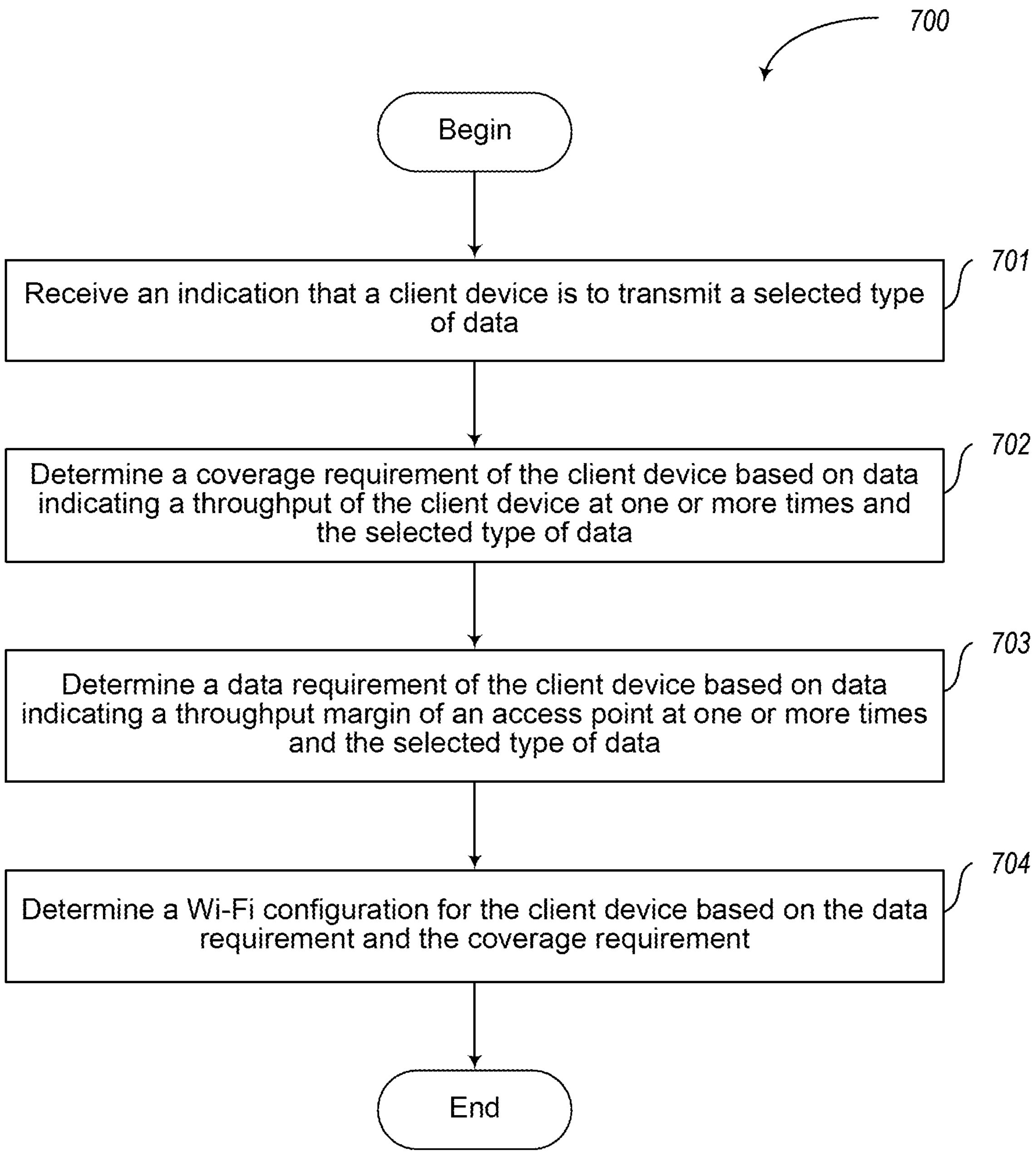
FIG. 7 is a flow diagram depicting a process for determining a Wi-Fi configuration for a client device based on a type of data transmitted by the client device, according to various embodiments described herein.

FIG. 7 is a flow diagram depicting a process 700 for determining a Wi-Fi configuration for a client device based on a type of data transmitted by the client device, according to various embodiments described herein. The process 700 may be performed by a network configuration system, such as the network configuration system 200 described above with respect to FIG. 2.

The process 700 begins, after a start block, at act 701, where the network configuration system receives an indication that a client device is to transmit a selected type of data. In some embodiments, the indication that the client device is to transmit the selected type of data is received from the client device. In some embodiments, one or more data packets transmitted by the client device are analyzed to determine whether the client device is expected to transmit a selected type of data. In some embodiments, historical data regarding data transmitted by the client is used to determine one or more times at which the client device is expected to transmit a selected type of data.

The process 700 proceeds to act 702, where the network configuration system determines a coverage requirement of the client device based on data indicating a throughput of the client device at one or more times and the selected type of data. The network configuration system may determine the coverage requirement in a similar manner to act 402, 502, or 802 each described in connection with FIGS. 4, 5, and 8 respectively.

The process 700 proceeds to act 703, where the network configuration system determines a data requirement of the client device based on data indicating a throughput margin of an access point at one or more times and the selected type of data. The network configuration system may determine the coverage requirement in a similar manner to act 403, 502, or 802 each described in connection with FIGS. 4, 5, and 8 respectively.

The process 700 proceeds to act 704, where the network configuration system determines a Wi-Fi configuration for the client device based on the data requirement and the coverage requirement. The network configuration system may perform act 704 in a similar manner to act 404, described above in connection with FIG. 4.

After act 704, the process 700 ends. In some embodiments, the network configuration system performs one of acts 702 or 703 without performing the other.

Figure 8:
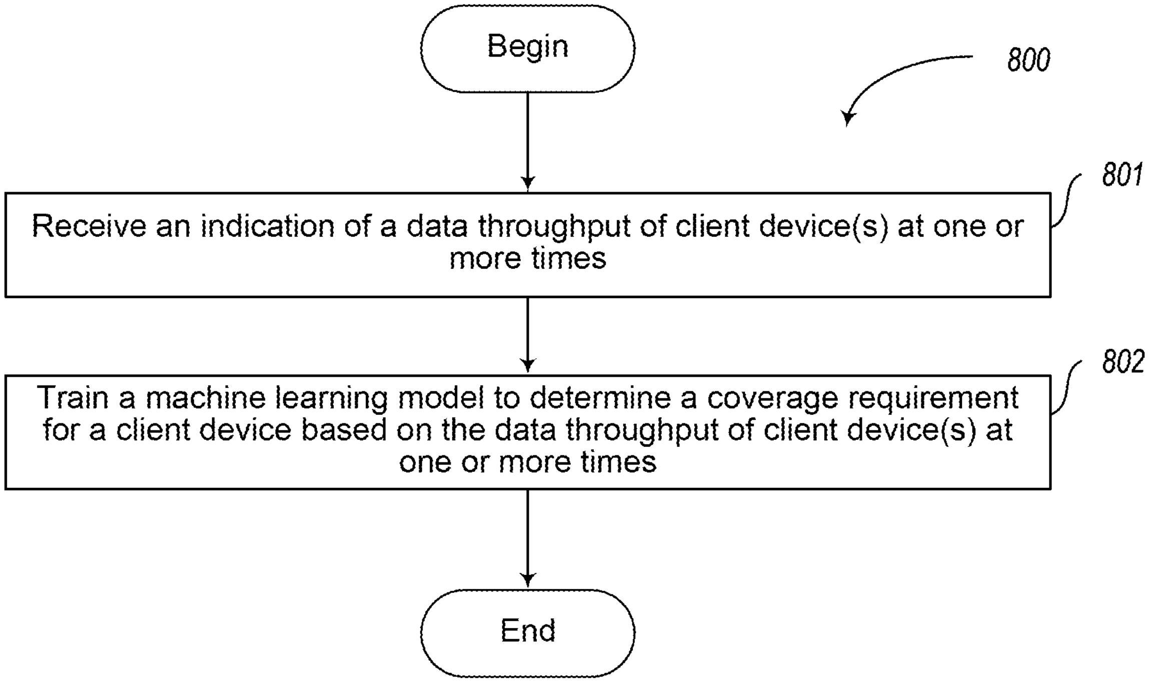
FIG. 8 is a flow diagram depicting a process for training a machine learning model to determine a coverage requirement for a client device, according to various embodiments described herein.

FIG. 8 is a flow diagram depicting a process 800 for training a machine learning model to determine a coverage requirement for a client device, according to various embodiments described herein. The process 800 may be performed by a network configuration system, such as the network configuration system 200 described above with respect to FIG. 2.

The process 800 begins, after a start block, at act 801 where the network configuration system receives an indication of a data throughput of one or more client devices at one or more times. In some embodiments, the network configuration system performs act 801 in a similar manner to act 501.

The process 800 proceeds to act 802, where the network configuration system trains a machine learning model to determine a coverage requirement for a client device based on data received in act 801. In some embodiments, the training data for the machine learning model includes an indication of one or more attributes of client devices, an indication of a type of the client devices, an indication of one or more attributes of access points, an indication of one or more types of data transmitted by client devices, an indication of one or more time ranges during which client deices transmit data, an indication of one or more locations of one or more client devices, an indication of one or more locations of one or more access points, or some combination thereof.

After act 802, the process 800 ends.

Figure 9:
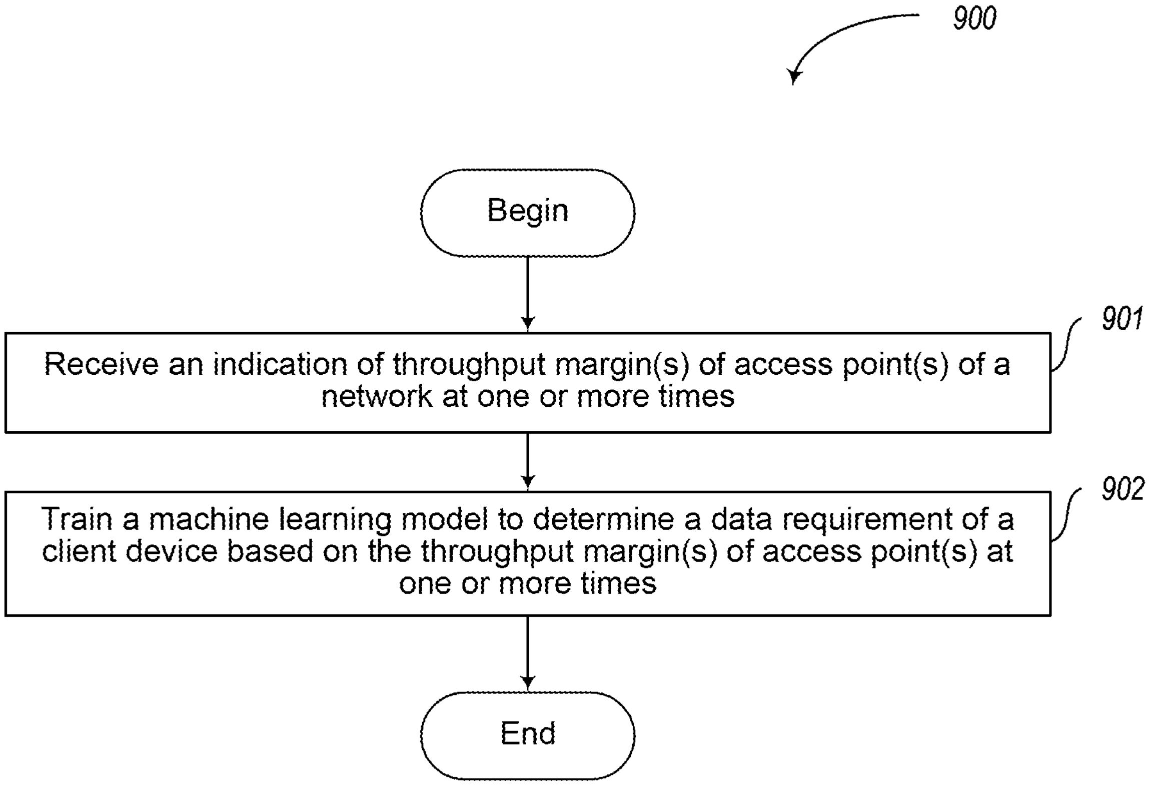
FIG. 9 is a flow diagram depicting a process for training a machine learning model to determine a throughput margin of an access point, according to various embodiments described herein.

FIG. 9 is a flow diagram depicting a process 900 for training a machine learning model to determine a throughput margin of an access point, according to various embodiments described herein. The process 800 may be performed by a network configuration system, such as the network configuration system 200 described above with respect to FIG. 2.

The process 900 begins, after a start block, at act 901 where the network configuration system receives an indication of a one or more throughput margins of one or more access points of a network at one or more times. In some embodiments, the network configuration system performs act 901 in a similar manner to act 601.

The process 900 proceeds to act 902, where the network configuration system trains a machine learning model to determine a coverage requirement for a client device based on data received in act 901. In some embodiments, the training data for the machine learning model includes an indication of one or more attributes of client devices, an indication of a type of the client devices, an indication of one or more attributes of access points, an indication of one or more types of data transmitted by client devices, an indication of one or more time ranges during which client deices transmit data, an indication of one or more locations of one or more client devices, an indication of one or more locations of one or more access points, or some combination thereof.

After act 902, the process 900 ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for configuring a Wi-Fi connection for a set of client devices connected to a network, the system comprising:

at least one processor; and at least one memory coupled to the at least one processor, the memory having computer-executable instructions stored thereon that, when executed by the at least one processor, cause the system to:

identify the set of client devices, the set of client devices including one or more client devices; and for each respective client device of the set of client devices:

determine a coverage requirement of the respective client device, the coverage requirement representing an amount of data likely to be transmitted to the respective client device from an access point in order for the respective client device to perform one or more of its functions;

determine a data requirement of the respective client device, the data requirement representing a rate at which data is to be transmitted to the respective client device from the access point in order for the respective client device to perform one or more of its functions;

determine a Wi-Fi configuration for the respective client device based on the determined coverage requirement and the determined data requirement; and cause the respective client device to transmit data based on the determined Wi-Fi configuration.

2. The system of claim 1, wherein to cause the respective client device to transmit data based on the determined Wi-Fi configuration, the computer-executable instructions, when executed by the at least one processor, further cause the system to:

transmit information that instructs the respective client device to configure the Wi-Fi configuration of the respective client device based on the determined Wi-Fi configuration.

3. The system of claim 1, wherein to determine the coverage requirement of the respective client device, the computer-executable instructions, when executed by the at least one processor, further cause the system to:

receive data indicating a data throughput of the client device at one or more times; and determine the coverage requirement of the client device based on the data indicating the data throughput of the client device at one or more times.

4. The system of claim 1, wherein to determine the coverage requirement of the respective client device, the computer-executable instructions, when executed by the at least one processor, further cause the system to:

receive data indicating that the respective client device is expected to transmit a selected type of data;

determine an expected throughput of the respective client device based on the data indicating that the respective client device is expected to transmit the selected type of data; and determine the coverage requirement of the client device based on the expected throughput of the respective client device.

5. The system of claim 1, wherein to determine the data requirement of the respective client device, the computer-executable instructions, when executed by the at least one processor, further cause the system to:

determine a throughput margin of an access point of the network at one or more times, wherein the one or more times include at least one idle time of the access point; and determine the data requirement of the client device based on the data indicating the throughput margin of the access point at one or more times.

6. The system of claim 1, wherein to determine the data requirement of the respective client device, the computer-executable instructions, when executed by the at least one processor, further cause the system to:

receive data indicating that the respective client device is expected to transmit a selected type of data;

determine a throughput margin of an access point of the network at one or more times; and determine the coverage requirement of the client device based on the selected type of data and the throughput margin.

7. The system of claim 1, wherein the computer-executable instructions, when executed by the at least one processor, further cause the system to:

for each respective client device of the set of client devices:

receive data indicating a data throughput of the respective client device at one or more times;

train a machine learning model to determine a data throughput required by a client device based on the data received for each respective client device of the set of client devices; and wherein to determine the coverage requirement of a client device, the system is further configured to apply an indication of the client device and a time at which the client device is expected to transmit data to the machine learning model.

8. The system of claim 1, wherein the computer-executable instructions, when executed by the at least one processor, further cause the system to:

receive data indicating a throughput margin of the access point at one or more times;

train a machine learning model to determine a data requirement of a client device based on the data indicating the throughput margin of the access point at one or more times; and wherein to determine the data requirement of a client device, the system is further configured to apply an indication of the client device and a time at which the client device is expected to transmit data to the machine learning model.

9. The system of claim 1, wherein to determine the Wi-Fi configuration for the respective client device, the computer-executable instructions, when executed by the at least one processor, further cause the system to:

receive data indicating one or more attributes of the respective client device; and determine the Wi-Fi configuration for the respective client device based on the determined coverage requirement, the determined data requirement, and the one or more attributes of the respective client device.

10. The system of claim 1, wherein to determine the Wi-Fi configuration for the respective client device, the computer-executable instructions, when executed by the at least one processor, further cause the system to:

determine a transmission power of the respective client device based on the determined data requirement, wherein the determined transmission power is greater than, less than, or equal to the current transmission power of the respective client device.

11. The system of claim 1, wherein to determine the Wi-Fi configuration for the respective client device, the computer-executable instructions, when executed by the at least one processor, further cause the system to:

determine a modulation coding scheme ("MCS") for the respective client device based on the determined data requirement, wherein the determined MCS is different from, or the same as, the current MCS used by the respective client device.

12. The system of claim 1, wherein to determine the Wi-Fi configuration for the respective client device, the computer-executable instructions, when executed by the at least one processor, further cause the system to:

determine a location of the respective client device relative to an access point of the network; and determine the Wi-Fi configuration based on the determined coverage requirement, the determined data requirement, and the location of the respective client device relative to the access point of the network.

13. The system of claim 1, wherein to determine the Wi-Fi configuration for the respective client device, the computer-executable instructions, when executed by the at least one processor, further cause the system to:

determine which of an MCS or a transmission power of the respective client device should be changed first; and determine the Wi-Fi configuration based on the determined coverage requirement, the determined data requirement, and the determination of which of the MCS or transmission power of the respective client device should be changed first.

14. A method performed by a client device, the method comprising:

connecting to a network via a Wi-Fi access point;

transmitting data via the network, wherein the transmitted data indicates a coverage requirement and a data requirement of the client device, the coverage requirement representing an amount of data likely to be transmitted to the client device from an access point in order for the client device to perform one or more of its functions and the data requirement representing a rate at which data is to be transmitted to the client device from the access point in order for the client device to perform one or more of its functions;

receiving an indication from a network configuration system indicating a network configuration for the client device, wherein the indicated network configuration is generated based on the transmitted data; and altering the network configuration of the client device based on the indicated network configuration.

15. The method of claim 14, wherein altering the network configuration of the client device further comprises:

altering one or more of an MCS or a transmission power based on the determined network configuration.

16. The method of claim 14, wherein the method further comprises:

transmitting an indication to the network configuration system that the client device is to transmit a selected type of data.

17. The method of claim 14, wherein the method further comprises:

transmitting an indication of one or more attributes of the client device to the network configuration system.

18. A non-transitory processor-readable storage medium that stores at least one of instructions or data, the instructions or data, when executed by at least one processor, cause the at least one processor to perform a method comprising:

identifying a client device;

receiving data indicating a coverage requirement of the client device, the coverage requirement representing an amount of data likely to be transmitted to the client device from an access point in order for the client device to perform one or more of its functions;

receiving data indicating a data requirement of the client device, the data requirement representing a rate at which data is to be transmitted to the client device from the access point in order for the client device to perform one or more of its functions;

determining a network configuration for the client device based on the received coverage requirement and the received data requirement; and causing a network configuration of the client device to be altered based on the determined network configuration.

19. The non-transitory processor-readable storage medium of claim 18, wherein the data indicating the coverage requirement of the client device comprises data indicating a data throughout of the client device and wherein the method further comprises:

determining the coverage requirement of the client device based on the data indicating the data throughput of the client device.

20. The non-transitory processor-readable storage medium of claim 18, wherein the data indicating the data requirement of the client device comprises data indicating a throughput margin of an access point and wherein the method further comprises:

determining the data requirement of the client device based on the data indicating the throughput margin of the access point.

* * * * *